(12) United States Patent
Osakabe et al.

(10) Patent No.: US 8,934,149 B2
(45) Date of Patent: Jan. 13, 2015

(54) IMAGE READER

(71) Applicants: Yoshinori Osakabe, Seto (JP); Hiromi Tanaka, Nagoya (JP)

(72) Inventors: Yoshinori Osakabe, Seto (JP); Hiromi Tanaka, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 13/934,454

(22) Filed: Jul. 3, 2013

(65) Prior Publication Data
US 2014/0009801 A1 Jan. 9, 2014

(30) Foreign Application Priority Data
Jul. 6, 2012 (JP) ................................ 2012-153068

(51) Int. Cl.
*H04N 1/04* (2006.01)
*H04N 1/00* (2006.01)
*H04N 1/10* (2006.01)
*H04N 1/193* (2006.01)

(52) U.S. Cl.
CPC ......... *H04N 1/00997* (2013.01); *H04N 1/1017* (2013.01); *H04N 1/193* (2013.01); *H04N 1/0083* (2013.01); *H04N 1/103* (2013.01); *H04N 2201/03166* (2013.01)
USPC .............................. 358/474; 358/497; 399/91

(58) Field of Classification Search
CPC ................ H04N 1/1017; H04N 1/193; H04N 2201/02404; H04N 1/04; H04N 1/00559; H04N 1/00588; H04N 2201/02402; B65B 11/045; B65B 9/02
See application file for complete search history.

(56) References Cited

U.S. PATENT DOCUMENTS

| 4,989,099 | A | * | 1/1991 | Koshiyouji et al. ........... 358/474 |
| 6,081,351 | A | | 6/2000 | Tabata |
| 6,169,611 | B1 | * | 1/2001 | Brook et al. .................. 358/487 |
| 6,476,373 | B1 | * | 11/2002 | Gilpin ........................ 250/208.1 |
| 6,724,503 | B1 | | 4/2004 | Sako et al. |
| 6,771,397 | B2 | * | 8/2004 | Hashizume ................... 358/474 |
| 6,892,945 | B2 | | 5/2005 | Shishido |
| 7,042,599 | B2 | | 5/2006 | Yokota et al. |
| 7,088,475 | B1 | * | 8/2006 | Terashima et al. ........... 358/448 |
| 7,136,203 | B2 | | 11/2006 | Yokota et al. |
| 7,233,420 | B2 | * | 6/2007 | Hayashi ........................ 358/497 |
| 7,378,644 | B2 | * | 5/2008 | Kubota et al. ................. 250/234 |

(Continued)

FOREIGN PATENT DOCUMENTS

| CN | 1338665 A | 3/2002 |
| CN | 1783937 A | 6/2006 |

(Continued)

OTHER PUBLICATIONS

Non-final Office Action received in corresponding U.S. Appl. No. 13/432,712 mailed Jul. 31, 2013.

(Continued)

*Primary Examiner* — Negussie Worku
(74) *Attorney, Agent, or Firm* — Banner & Witcoff, Ltd.

(57) ABSTRACT

An image reader is provided, which includes a housing, a document table, a reading unit disposed between the housing and the document table and configured to read an image of a document sheet on the document table, and a carriage configured to hold the reading unit and move along a moving direction, the carriage including a protruding portion formed to protrude toward the reading unit, on a bottom surface of the carriage that faces a lower surface of the reading unit.

16 Claims, 10 Drawing Sheets

(56) References Cited

U.S. PATENT DOCUMENTS

| | | | |
|---|---|---|---|
| 7,391,543 B2* | 6/2008 | Ohara | 358/483 |
| 7,639,404 B2 | 12/2009 | Ikeno et al. | |
| 8,014,045 B2* | 9/2011 | Aoyama et al. | 358/496 |
| 8,120,821 B2* | 2/2012 | Ishida et al. | 358/474 |
| 8,199,382 B2* | 6/2012 | Osakabe | 358/497 |
| 8,218,204 B2* | 7/2012 | Hozono | 358/474 |
| 8,223,406 B2* | 7/2012 | Osakabe | 358/474 |
| 8,253,986 B2 | 8/2012 | Ikeno et al. | |
| 8,300,282 B2* | 10/2012 | Nakakita et al. | 358/474 |
| 8,659,802 B2 | 2/2014 | Ikeno et al. | |
| 8,659,807 B2* | 2/2014 | Hara et al. | 358/497 |
| 8,727,464 B2* | 5/2014 | Hara et al. | 347/3 |
| 2002/0054387 A1 | 5/2002 | Yokota et al. | |
| 2003/0081275 A1 | 5/2003 | Shishido | |
| 2006/0023267 A1 | 2/2006 | Ikeno et al. | |
| 2006/0077480 A1 | 4/2006 | Yokota et al. | |
| 2008/0198426 A1 | 8/2008 | Yokochi | |
| 2010/0060954 A1 | 3/2010 | Ikeno et al. | |
| 2010/0128328 A1* | 5/2010 | Hozono | 358/474 |
| 2010/0277776 A1 | 11/2010 | Osakabe | |
| 2011/0075229 A1 | 3/2011 | Fujiwara | |
| 2012/0268801 A1 | 10/2012 | Nakajima et al. | |
| 2012/0281260 A1 | 11/2012 | Ikeno et al. | |

FOREIGN PATENT DOCUMENTS

| | | |
|---|---|---|
| EP | 1 622 354 A2 | 2/2006 |
| EP | 1 622 354 A3 | 4/2006 |
| JP | 10-013636 | 1/1998 |
| JP | 11-074497 | 5/2003 |
| JP | 2003-134307 A | 5/2003 |
| JP | 2012-227710 A | 11/2012 |
| TW | 419926 A | 1/2001 |

OTHER PUBLICATIONS

Notice of Allowance issued in U.S. Appl. No. 13/432,712 mailed Dec. 6, 2013.
European Search Report received in corresponding EP Application No. 12162086.8 mailed May 14, 2013.
Office Action received in counterpart Chinese Application No. 201210101458.7, dated Mar. 28, 2014.
Aug. 21, 2014—(CN) Second Office Action—App 201210101458.7—Eng Tran.

* cited by examiner

IMAGE READER

CROSS-REFERENCE TO RELATED APPLICATION

This application claims priority under 35 U.S.C. §119 from Japanese Patent Application No. 2012-153068 filed on Jul. 6, 2012. The entire subject matter of the application is incorporated herein by reference.

BACKGROUND

1. Technical Field

The following description relates to one or more techniques for an image reader configured to read an image of a document sheet.

2. Related Art

An image reader has been known that includes a document table of a glass plate, a carriage disposed under the document table, and a reading unit mounted on the carriage. To read an image formed on a document sheet, the document sheet is placed on the document table with a side thereof to be read facing the document table. Then, the reading unit is controlled to emit light to the document sheet on the document table while the carriage is moved along a guide rail at a predetermined speed. The image on the document sheet is read by an image sensor of the reading unit receiving reflected light from the document sheet. Further, the reading unit of the image reader is configured to read an image of a document sheet passing over the document table.

The image reader includes a document cover configured to be opened and closed relative to the document table. After the document cover is opened, a document sheet is placed on the document table, and then the document cover is closed. The closed document cover presses the document sheet against the document table and covers the document table. Thereby, it is possible to place the document sheet in close contact with the document table and prevent entry of outside light into the reading unit. Consequently, it is possible to read the image of the document sheet in a preferable manner.

SUMMARY

However, in the case of reading an image of a thick document such as a book, the document cover might not adequately be closed. When the document cover remains opened, outside light is incident to the reading unit, and it might result in a lowered accuracy for reading the image.

Aspects of the present invention are advantageous to provide one or more improved techniques for an image reader that make it possible to reduce an amount of outside light incident to a reading unit.

According to aspects of the present invention, an image reader is provided that includes a housing, a document table, a reading unit disposed between the housing and the document table and configured to read an image of a document sheet on the document table, a carriage configured to hold the reading unit and move along a moving direction, and the carriage including a protruding portion formed to protrude toward the reading unit, on a bottom surface of the carriage that faces a lower surface of the reading unit.

According to aspects of the present invention, further provided is an image reader that includes a housing, a document table, a reading unit disposed between the housing and the document table and configured to read an image of a document sheet on the document table, a carriage configured to hold the reading unit and move along a moving direction, and the carriage including a reflection reduction portion formed on a bottom surface of the carriage that faces a lower surface of the reading unit, so as to reduce an amount of light incident to the bottom surface of the carriage and reflected toward the reading unit.

According to aspects of the present invention, further provided is an image reader that includes a housing having an opening, a document table configured to cover the opening of the housing, an image reading unit disposed between the document table and the housing, the image reading unit including an image sensor unit configured to read an image of a document sheet on the document table in a main-scanning direction, and a carriage configured to hold the image sensor and move along a sub-scanning direction perpendicular to the main-scanning direction, the carriage having a surface that faces toward the document table and is formed in a saw-tooth shape to prevent light incident through the document table from being reflected toward the image sensor unit.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an embodiment according to aspects of the present invention will be described in detail with reference to the accompanying drawings.

<External Configuration of MFP>

Figure 1:
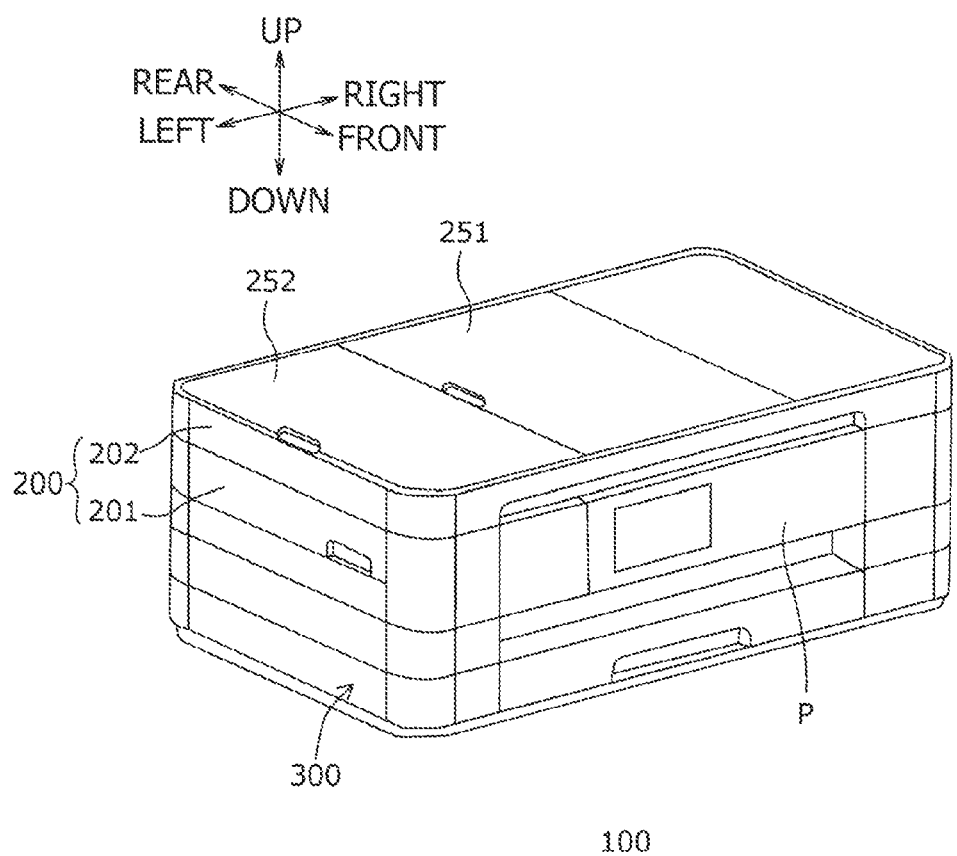
FIG. 1 is a perspective view, from an upper left front side, of a multi-function peripheral (MFP) including an image reading unit in a state where an automatic document feeder (ADF) is closed in an embodiment according to one or more aspects of the present invention.

As shown in FIG. 1, a multi-function peripheral (MFP) 100 is formed substantially in a cuboid shape. The MFP 100 includes an image reading unit 200 and an image forming unit 300.

It is noted that, in the following descriptions, a left-to-right direction, a front-to-rear direction, and a vertical direction of the MFP 100, in a state placed on a horizontal surface, will be defined as shown in FIG. 1.

The image reading unit 200 is formed substantially in a flattened cuboid shape. The image reading unit 200 is configured to rotate around an axis line that extends in the left-to-right direction near an upper rear end of the image forming unit 300, between a closed position and an open position relative to the image forming unit 300. In the closed position, the image reading unit 200 is disposed (piled) on the image forming unit 300. In the open position, the image reading unit 200 is open with a front side thereof lifted relative to the image forming unit 300.

Figure 2:
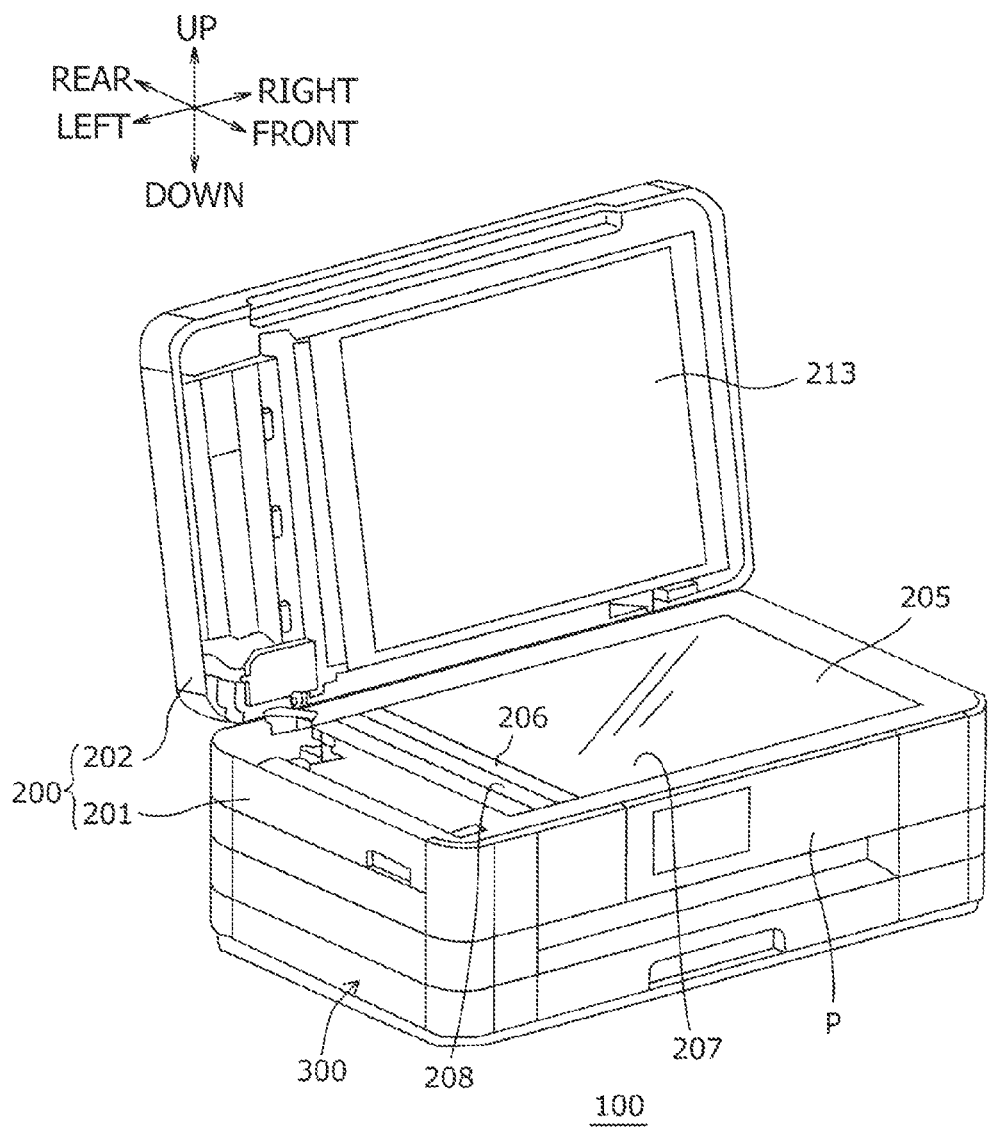
FIG. 2 is a perspective view, from the upper left front side, of the MFP in a state where the ADF is open in the embodiment according to one or more aspects of the present invention.

The image reading unit 200 includes an image reading main body 201 and an automatic document feeder (ADF) 202. The ADF 202 is disposed above the image reading main body 201. The ADF 202 is configured to rotate around an axis line that extends in the left-to-right direction near an upper rear end of the image reading main body 201, between a closed position (see FIG. 1) and an open position (see FIG. 2) relative to the image forming unit 300. In the closed position, the ADF 202 is disposed (piled) on the image reading main body 201. In the open position, the ADF 202 is open with a front side thereof lifted relative to the image reading main body 201.

The image forming unit 300 is formed substantially in a cuboid shape. The image forming unit 300 includes an operation panel P disposed at an upper portion of a front side thereof. The operation panel P is configured to be operated by a user.

<Configuration for Image Reading of Image Reading Unit>

The image reading unit 200 includes a housing 203, a contact glass 205, a contact image sensor (CIS) unit 211, a carriage 210, and a white reference plate 209.

Figure 3:
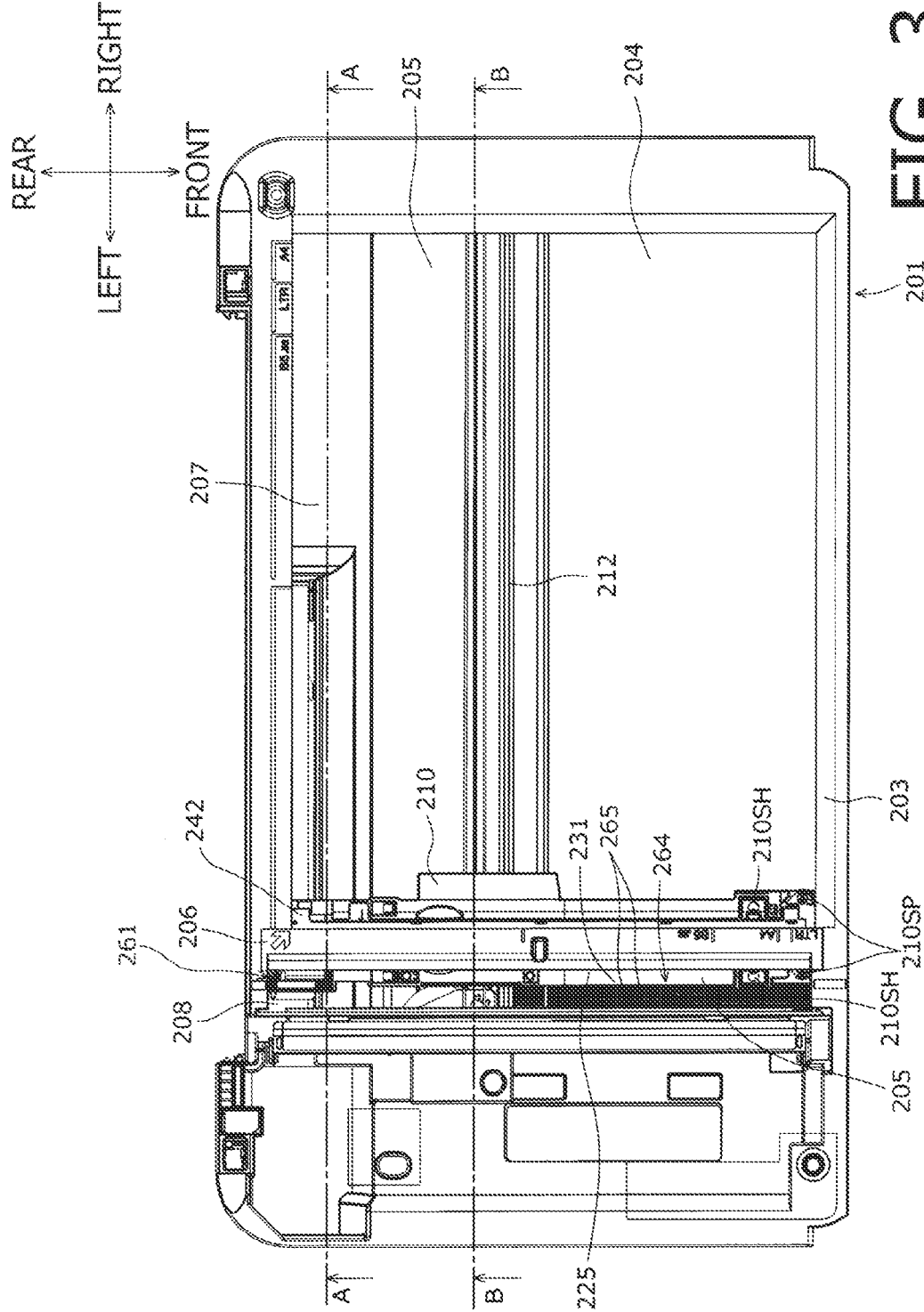
FIG. 3 is a top view of an image reading main body of the image reading unit in the embodiment according to one or more aspects of the present invention.
Figure 4:
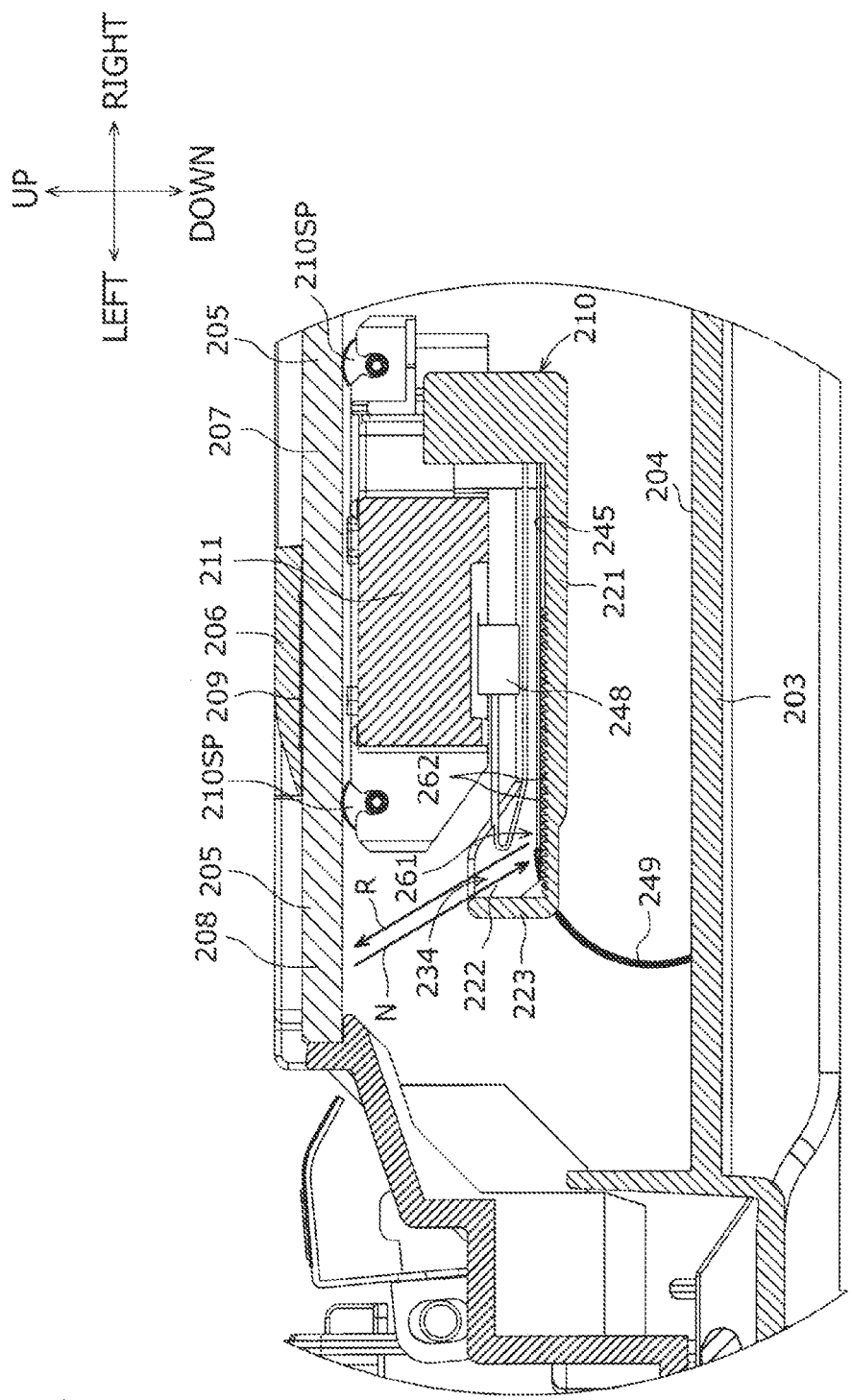
FIG. 4 is a cross-sectional view of the image reading main body taken along a cutting line A-A shown in FIG. 3 in the embodiment according to one or more aspects of the present invention.
Figure 5:
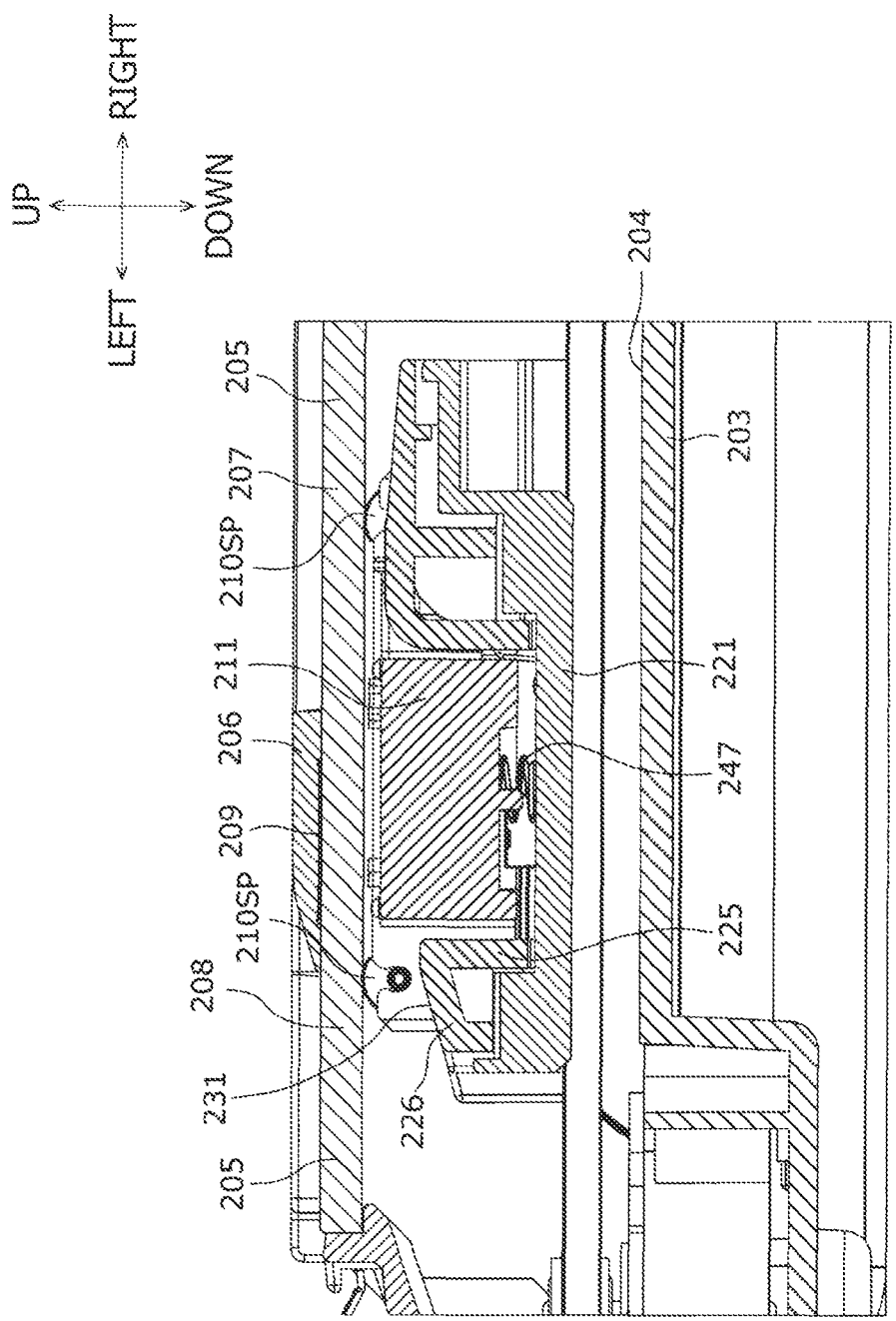
FIG. 5 is a cross-sectional view of the image reading main body taken along a cutting line B-B shown in FIG. 3 in the embodiment according to one or more aspects of the present invention.

As shown in FIGS. 3, 4, and 5, the housing 203 made of resin is provided to the image reading main body 201 of the image reading unit 200. As shown in FIG. 3, the housing 203, when viewed from above, is formed in a substantially rectangular shape. Further, as shown in FIGS. 4 and 5, the housing 203 has a bottom surface 204.

It is noted that hatched areas in FIGS. 4 and 5 represent cross-sectional surfaces of the image reading main body 201 along a cutting plane A-A and a cutting plane B-B (see FIG. 3), respectively. Meanwhile, non-hatched areas in FIGS. 4 and 5 represent portions of the image reading main body 201 behind the cutting plane A-A and the cutting plane B-B (see FIG. 3) in the front-to-rear direction, respectively.

As shown in FIGS. 3, 4, and 5, the contact glass 205 is held by the housing 203. The contact glass 205 includes a rectangular transparent glass having a longitudinal direction along the left-to-right direction. The contact glass 205 is provided between an upper front portion and an upper rear portion of the housing 203. The contact glass 205 is disposed horizontally to close an upper side of the housing 203. The contact glass 205 is provided with a reference plate 206, a document placement table 207, and a document contact portion 208. The document placement table 207 and the document contact portion 208 are formed from a single piece of the contact glass 205. The document placement table 207 is a part of the contact glass 205 between the reference plate 206 and a right end of the contact glass 205. Namely, the document placement table 207 is disposed on a right side of the reference plate 206. The document contact portion 208 is a part of the contact glass 205 between the reference plate 206 and a left end of the contact glass 205. Namely, the document contact portion 208 is disposed on a left side of the reference plate 206. The document placement table 207 is configured to receive placement of a document sheet. The document contact portion 208 is configured such that a document sheet being conveyed passes over the document contact portion 208. The contact glass 205, viz., the document placement table 207 and the document contact portion 208 are disposed above the CIS unit 211.

The CIS unit 211 is disposed between the bottom surface 204 of the housing 203 and the contact glass 205. The CIS unit 211 is configured to read an image of a document sheet placed on the contact glass 205. More specifically, the CIS unit 211 is configured to, when being under the document placement table 207, read an image of a document sheet pressed by a document pressing plate 213 (see FIG. 2) against the document placement table 207. Further, the CIS unit 211 is configured to, when being under the document contact portion 208, read an image of a document sheet passing over the document contact portion 208. The CIS unit 211 includes therein an LED light source, lenses, and an image sensor. The CIS unit 211 extends in the front-to-rear direction perpendicular to the left-to-right direction.

The carriage 210 is disposed between the bottom surface 204 of the housing 203 and the contact glass 205. The carriage 210 holds the CIS unit 211. On the bottom surface 204 of the housing 203 is a guiderail 212. The guiderail 212 is formed integrally with the housing 203. The guiderail 212 is formed as a protrusion extending in the left-to-right direction. The carriage 210 is provided to straddle the guiderail 212 in the front-to-rear direction. The carriage 210 is configured to be guided by the guiderail 212 and reciprocate along the left-to-right direction.

The reference plate 206 is disposed on the contact glass 205. The reference plate 206 is disposed on a side of the contact glass 205 with respect to the CIS unit 211 in the vertical direction. More specifically, as shown in FIG. 4, the reference plate 206 is disposed to face the CIS unit 211 across the contact glass 205 in the vertical direction. The reference plate 206 is read by the CIS unit 211 as a white reference in a case of shading correction. The reference plate 206, when viewed from above, is formed in a rectangular shape extending in the front-to-rear direction. As shown in FIG. 3, each end of the reference plate 206 in the front-to-rear direction is disposed outside a corresponding one of two ends of the contact glass 205 in the front-to-rear direction. As shown in FIG. 3, the reference plate 206 is disposed between a left end and a right end of the contact glass 205 in the left-to-right direction. The reference plate 206 includes a white reference plate 209.

The white reference plate 209 is disposed on a side of the contact glass 205 with respect to the CIS unit 211 in the vertical direction. More specifically, the white reference plate 209 is disposed to face the CIS unit 211 across the contact glass 205 in the vertical direction. The white reference plate 209 is a white tape to be read by the CIS unit 211 as a white reference in the case of shading correction. The white reference plate 209 is attached onto a lower surface of the reference plate 206.

<Configuration of Carriage>

Figure 6:
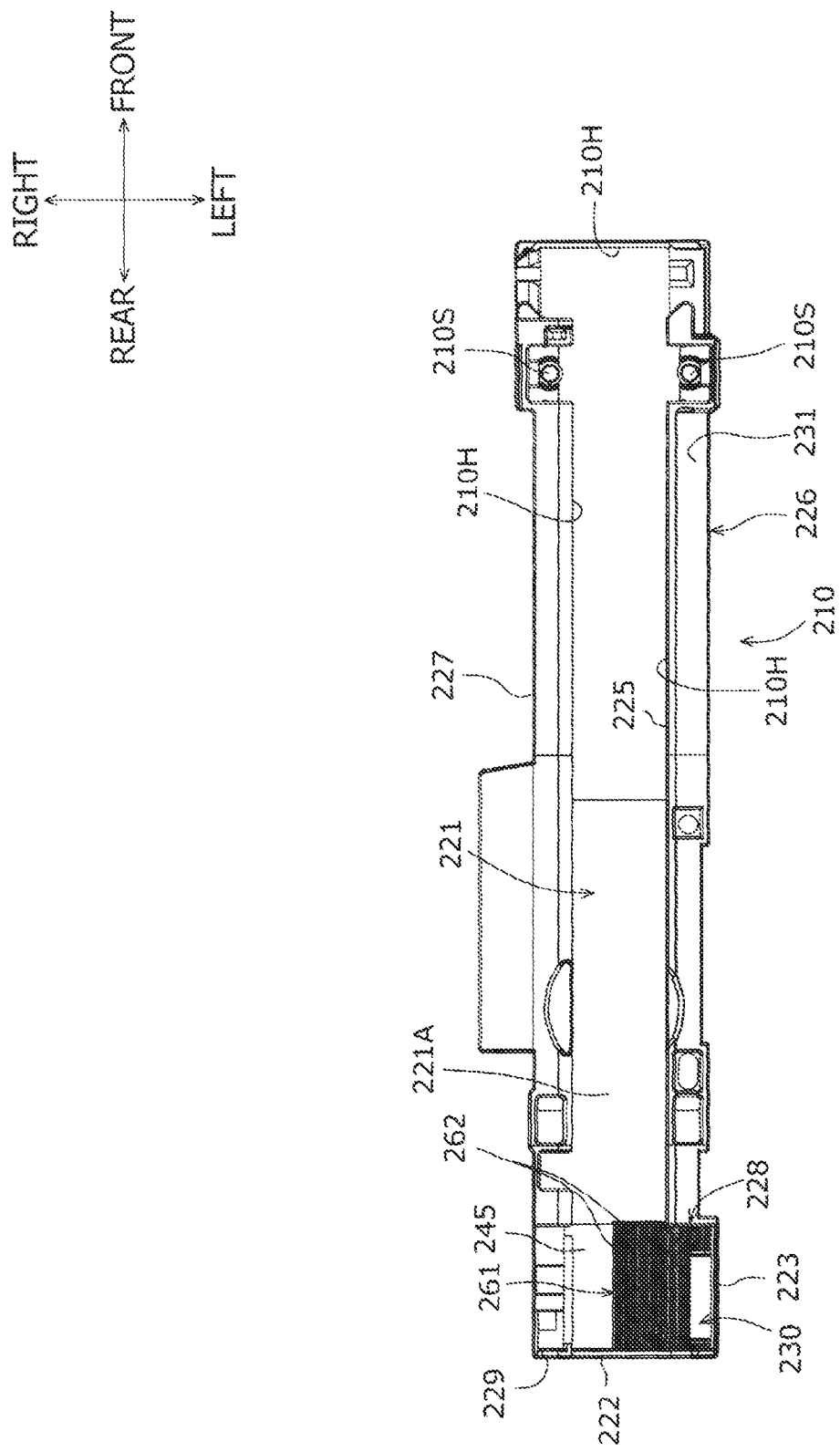
FIG. 6 is a top view of a carriage provided in the image reading main body in the embodiment according to one or more aspects of the present invention.
Figure 7:
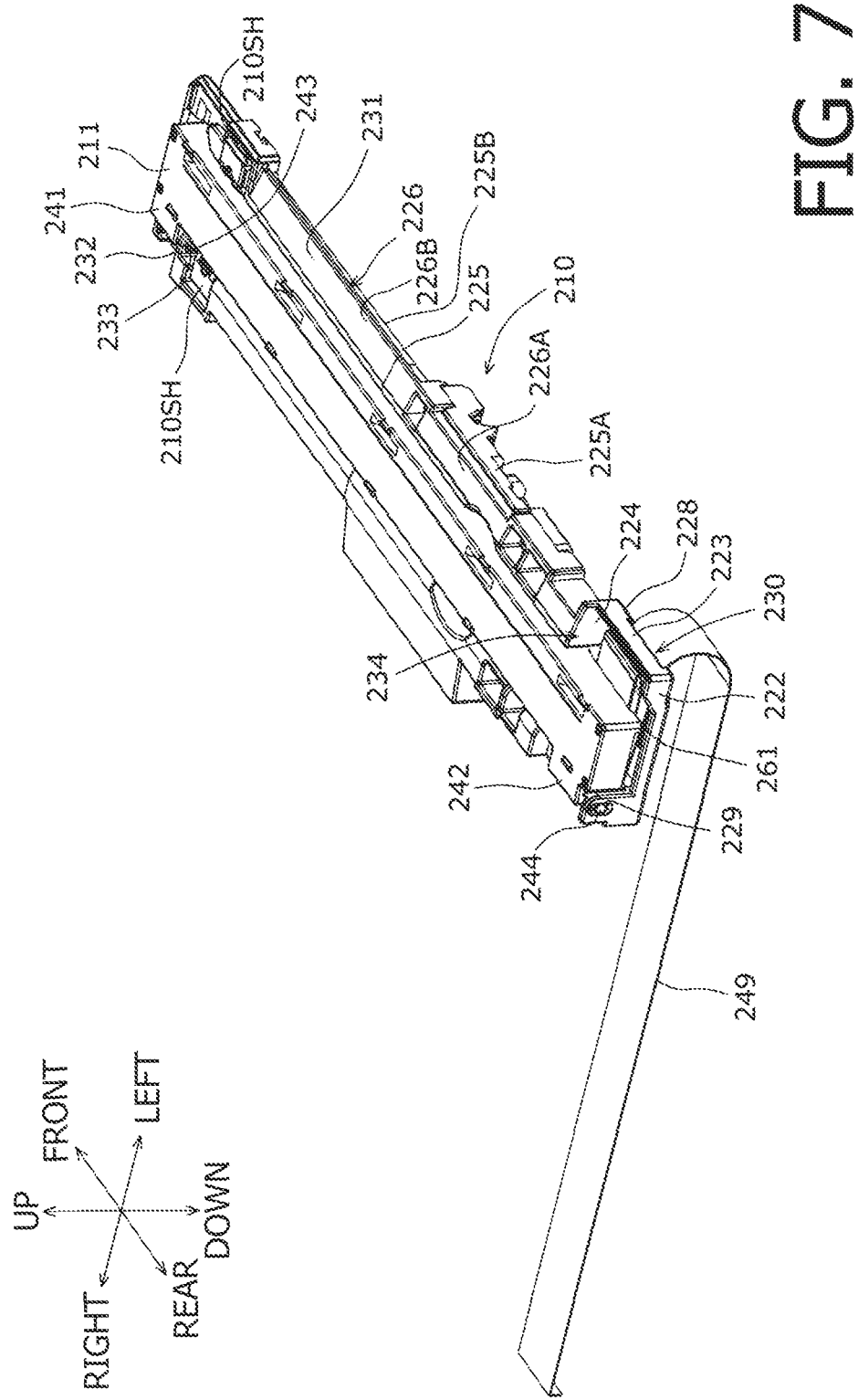
FIG. 7 is a perspective view from an upper left rear side, schematically showing the carriage, a contact image sensor (CIS) unit, and a flexible flat cable (FFC) provided in the image reading main body in the embodiment according to one or more aspects of the present invention.
Figure 8:
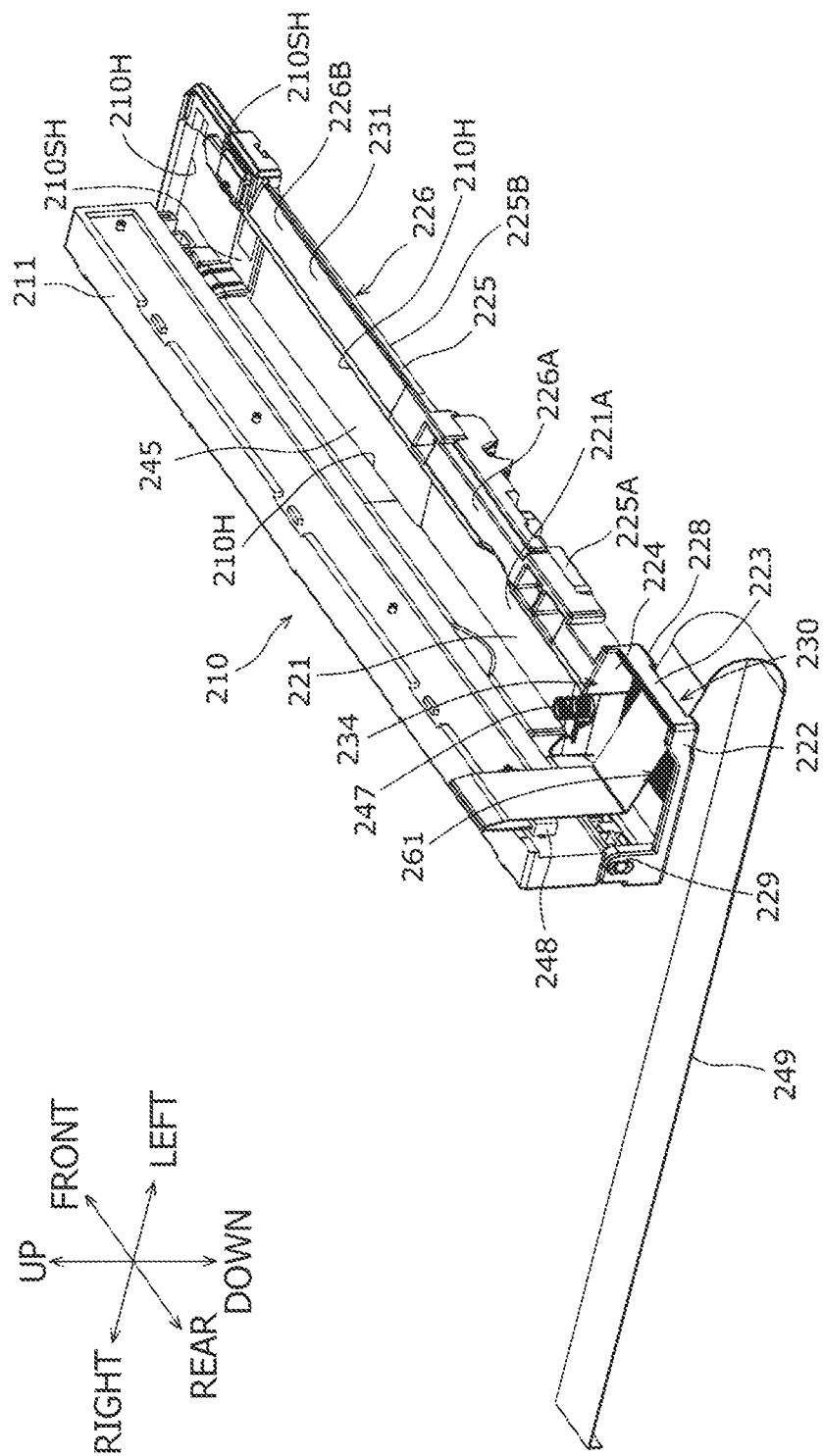
FIG. 8 is a perspective view from the upper left rear side, schematically showing the carriage, the CIS unit, and the FFC in a halfway state where the CIS unit is being attached to or detached from the carriage in the embodiment according to one or more aspects of the present invention.

As shown in FIGS. 6, 7, and 8, the carriage 210, when viewed from above, is formed in a rectangular shape extending in the front-to-rear direction. The carriage 210 is a resin-molded component. The carriage 210 is provided integrally with a bottom plate 221, a rear portion 222, a first left portion 223, a joint portion 224, a second left portion 225, an extension 226, and a right portion 227.

A bottom extension 228, which is a rear end portion of the bottom plate 221, is formed to be wider than a front portion 221A of the bottom plate 221 in the left-to-right direction. The bottom extension 228 extends leftward with respect to the front portion 221A. The bottom extension 228 has a rectangular shape. The carriage 210 has a hole 210H provided at a front side of the front portion 221A. The hole 210H is open in the vertical direction. A front portion of the CIS unit 211 is configured to be inserted into the hole 210H. As shown in FIG. 6, the carriage 210 includes spring installation portions 210S respectively disposed at left and right sides of the hole 210H. A coil spring (not shown) is provided on each spring installation portion 210S. As shown in FIGS. 7 and 8, a spring holder 210SH is provided on the coil springs. The spring holder 210SH is provided to extend from a left side to a right side of the carriage 210 so as to straddle the hole 210H. As shown in FIGS. 7 and 8, the CIS unit 211 is disposed on the spring holder 210SH. The CIS unit 211 is elastically urged upward, via the spring holder 210SH, by the coil springs (not shown) provided on the spring installation portions 210S.

The rear portion 222 extends upward from a rear end of the bottom plate 221. At an upper end of the rear portion 222, a shaft holding hole 229 is formed to penetrate in the front-to-rear direction.

The first left portion 223 extends upward from a left end of the bottom extension 228. The left portion 223 has a rectangular plate shape. An FFC insertion hole 230 is formed to straddle a left end of the bottom extension 228 and a lower end of the first left portion 223.

The joint portion 224 extends upward from a front end of the bottom extension 228. The joint portion 224 has a rectangular plate shape. A left end of the joint portion 224 is connected with a front end of the first left portion 223.

The second left portion 225 is a left end of the carriage 210. A rear portion 225A of the second left portion 225 extends upward from the front portion 221A of the bottom plate 221. The second left portion 225 extends forward from the rear portion 225A of the second left portion 225, and includes a front portion 225B. The hole 210H is disposed between the front portion 225B of the second left portion 225 and the right portion 227.

The extension 226 extends leftward from an upper end of the second left portion 225. The extension 226 has, as an upper surface, an inclined surface 231 that is inclined to become lower leftward. A rear portion 226A of the extension 226 is disposed above the rear portion 225A of the second left portion 225. A front portion 226B of the extension 226 is disposed above the front portion 225B of the second left portion 225.

The right portion 227 is spaced apart from a right end of the rear portion 222. The right portion 227 extends upward from a right end of the bottom plate 221. The right portion 227 includes a plate-shaped shaft holding portion 232 extending in the left-to-right direction. The shaft holding portion 232 has a shaft holding hole 233 formed to penetrate in the front-to-rear direction.

The carriage 210 has an opening 234 provided at an upper side of the bottom extension 228. The opening 234 is formed to be surrounded by the rear portion 222, the first left portion 223, and the joint portion 224.

<Configuration of CIS Unit>

As shown in FIGS. 7 and 8, the CIS unit 211 is formed substantially in a cuboid shape having a longitudinal direction along the front-to-rear direction. As shown in FIG. 7, at a front end and a rear end of the CIS unit 211, block-shaped projections 241 and 242 are formed to protrude rightward, respectively. On rear end surfaces of the projections 241 and 242, cylindrical supporting shafts 243 and 244 are provided to protrude rearward, respectively.

The supporting shafts 243 and 244 are inserted into the shaft holding holes 233 and 229 from front sides of the shaft holding holes 233, respectively. Thereby, the CIS unit 211 is rotatably supported by the rear portion 222 and the shaft holding portion 232. As shown in FIGS. 5 and 8, a helical compression spring 247 is between an upper surface 245 of the bottom plate 221 of the carriage 210 and a lower surface 246 of the CIS unit 211. The carriage 210 is elastically urged upward by the helical compression spring 247 and the aforementioned coil springs (not shown) provided on the spring installation portions 210S. By the elastic urging forces, the CIS unit 211 is put into close contact with the contact glass 205.

The carriage 210 includes spacer rollers 210SP. The spacer rollers 210SP are spacers for adjusting a gap between the contact glass 205 and the CIS unit 211. The spacer rollers 210SP are configured to rotate in sliding contact with the contact glass 205 in response to movement of the carriage 210 in the left-to-right direction.

<FFC>

As shown in FIG. 8, the CIS unit 211 includes a connector 248 provided at a rear end of the lower surface 246 of the CIS unit 211. The connector 248 is disposed in the same position as the opening in the front-to-rear direction. An end terminal provided at one end of a flexible flat cable (FFC) 249 is connected with the connector 248. The other end of the FFC 249 is connected with a control board (not shown). Thereby, the CIS unit 211 is electrically connected with the control board via the FFC 249.

When the one end of the FFC 249 is connected with the connector 248, as shown in FIG. 8, the CIS unit 211 is disposed in such a position that the lower surface 246 thereof extends in the vertical direction. Then, the one end of the FFC 249 is inserted into the FFC insertion hole 230 from an outside (i.e., a left side) of the FFC insertion hole 230. At this time, the opening 234 is formed at the upper side of the bottom extension 228. Therefore, the one end of the FFC 249 is allowed to be smoothly connected with the connector 248 without a finger of an operator hitting the carriage 210.

The one end of the FFC 249 is inserted into the connector 248 from above. Afterward, the CIS unit 211 is rotated and disposed in a position where the lower surface 246 of the CIS unit 211 faces the upper surface 245 of the bottom plate 221. At this time, since the opening 234 is formed at the upper side of the bottom extension 228, the CIS unit 211 is allowed to smoothly rotate without the FFC 249 colliding against the carriage 210.

<Antireflection Portions>

Figure 9:
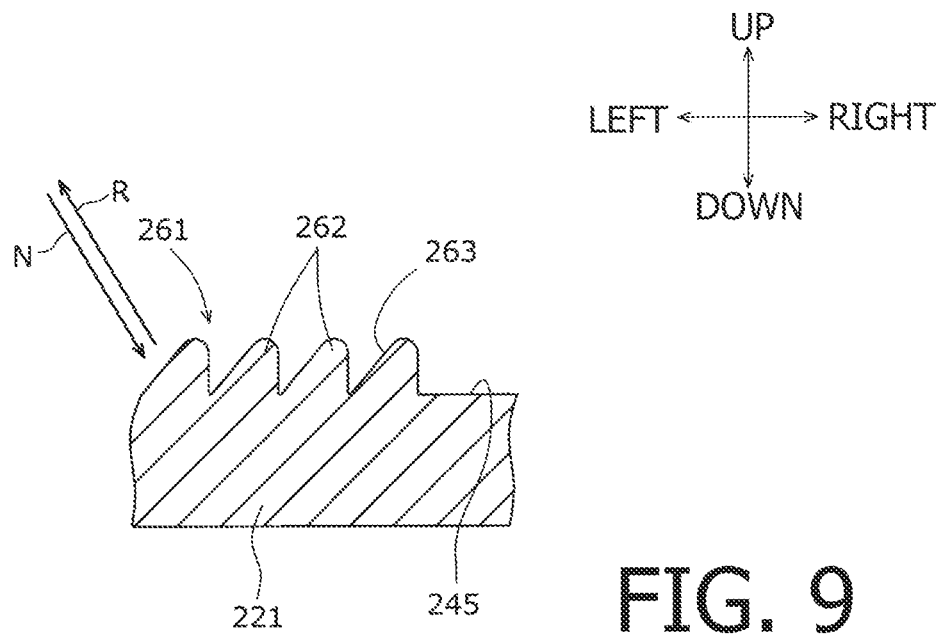
FIG. 9 is a cross-sectional view schematically showing protruding portions provided to the carriage in the embodiment according to one or more aspects of the present invention.

As shown in FIG. 6, a first antireflection portion 261 is disposed on the upper surface 245 of the bottom plate 221 of the carriage 210. The upper surface 245 is disposed in the same position as the opening 234 in the front-to-rear direction. Namely, the upper surface 245 is a rear part of an upper face of the bottom plate 225. As shown in FIG. 4, the first antireflection portion 261 includes a plurality of protruding portions 262. The plurality of protruding portions 262 are arranged in parallel on a side-by-side basis in the left-to-right direction. As shown in FIG. 9, each protruding portion 262 is provided with an inclined surface 263 that is inclined to become lower leftward, so as to have a substantially triangle cross-section along a plane perpendicular to the front-to-rear direction. Each protruding portion 262 is a protrusion extending in the front-to-rear direction.

Figure 10:
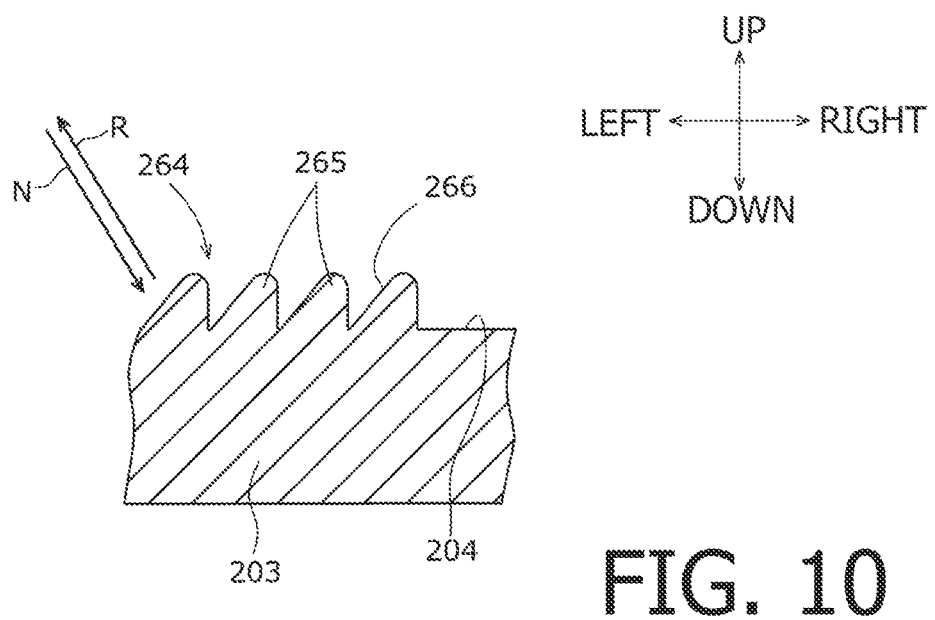
FIG. 10 is a cross-sectional view schematically showing base projections provided to a housing of the image reading main body in the embodiment according to one or more aspects of the present invention.

As shown in FIG. 3, a second antireflection portion 264 is disposed on the bottom surface 204 of the housing 203. The second antireflection portion 264 faces a substantially half part of the document contact portion 208 in the vertical direction. As shown in FIG. 10, the second antireflection portion 264 includes a plurality of base projections 265. The plurality of base projections 265 are arranged in parallel on a side-by-side basis in the left-to-right direction. Each base projection 265 is provided with an inclined base surface 266 that is inclined to become lower leftward, so as to have a substantially triangle cross-section along a plane perpendicular to the front-to-rear direction. Each base projection 265 is a protrusion extending in the front-to-rear direction.

<Configuration of ADF>

Figure 11:
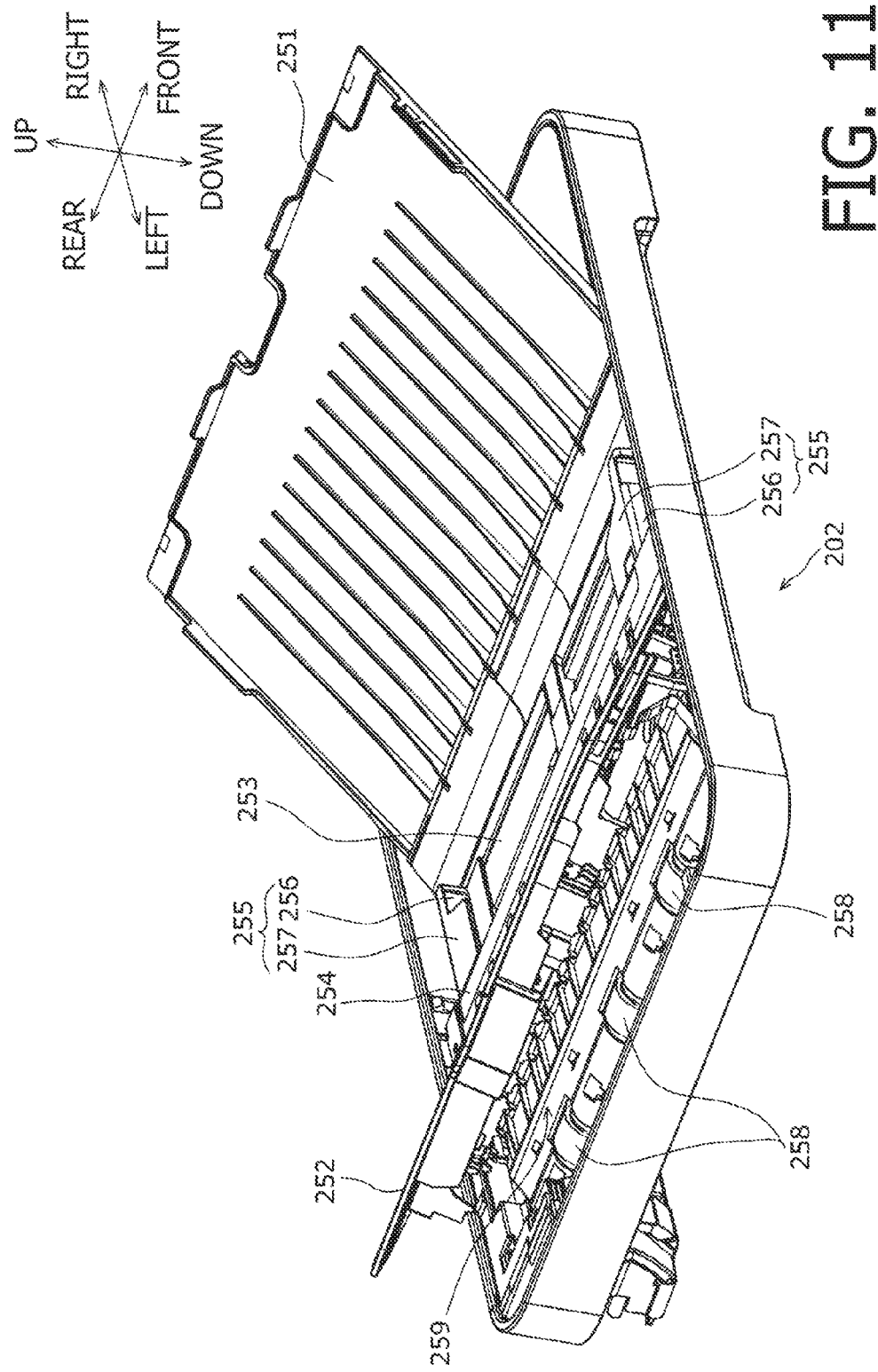
FIG. 11 is a perspective view, from an upper left front side, of the ADF in a state where a tray and a maintenance cover are open in the embodiment according to one or more aspects of the present invention.

As shown in FIG. 1, a tray 251 is disposed at a middle portion of the upper surface of the ADF 202. The tray 251, when viewed from above, is formed in a substantially rectangular shape. The tray 251 is configured to be open and closed when rotated around an axis line along the front-to-rear direction. An outer surface of the tray 251 in a closed state forms a part of the upper surface of the ADF 202. When the tray 251 is opened from a closed state, a left end of the tray 251 in the closed state is lifted, such that the tray 251 rotates rightward (clockwise in FIG. 1). As shown in FIG. 11, the tray 251, in an open state, extends inclined to become higher rightward.

As shown in FIG. 1, a maintenance cover 252 is disposed at a right end of the upper surface of the ADF 202. The maintenance cover, when viewed from above, is formed in a substantially rectangular shape. The maintenance cover 252 is configured to be open and closed when rotated around an axis line along the front-to-rear direction. An outer surface of the maintenance cover 252 in a closed state forms a part of the upper surface of the ADF 202. As shown in FIG. 11, the maintenance cover 252, in an open state, extends inclined to become higher leftward.

<Configuration for Document Feeding>

As shown in FIG. 11, the ADF 202 includes a supply section 253 and an ejection section 254 provided at a portion of the ADF 202 that is exposed when the tray 251 is open.

The supply section 253 is in a position lower than the ejection section 254. A right end of an upper surface of the supply section 253 is connected with an inner surface of the tray 251 in the open state, with a small gap therebetween.

The supply section 253 includes two document width guides 255. The two document width guides 255 face each other in the front-to-rear direction. Each document width guide 255 includes a guide wall 256 and a canopy 257. The guide wall 256 extends upward in the vertical direction from the upper surface of the supply section 253. The canopy 257 extends inward in the front-to-rear direction from an upper end of the guide wall 256. The two document width guides 255 are configured to concurrently move by the same distance with respect to a center therebetween so as to get close to and away from each other.

The ejection section 254 is disposed above the supply section 253 to have a gap therebetween. The ejection section 254 is formed in a rectangular plate shape extending in the front-to-rear direction and the left-to-right direction.

Three LF rollers 258 are rotatably provided at a portion exposed when the maintenance cover 252 is open. The three LF rollers 258 are supported by a shaft (not shown) extending in the front-to-rear direction and arranged at intervals along the front-to-rear direction.

Between uppermost points on circumference surfaces of the LF rollers 258 and the ejection section 254, a guide member 259 is disposed to straddle (parts of) the LF rollers 258 and (a part of) the ejection section 254.

When the ADF 202 is used, i.e., when a document sheet is fed, the two document width guides 255 are moved in such a manner that a width (distance) therebetween fits a width of the document sheet. Then, the document sheet is inserted from a right side into an area defined between the two document width guides 255, and is placed to straddle the supply section 253 and the tray 251 on the basis of the center between the two document width guides 255.

The document sheet, placed on the supply section 253 and the tray 251, is pulled leftward out of the supply section 253 and fed toward a lower side of the LF rollers 258 by a pickup roller (not shown). Afterward, the document sheet is conveyed along the circumferential surfaces of the LF rollers 258 and turned around in such a manner that a conveyance direction thereof is changed from a leftward direction to a rightward direction. Then, the document sheet is conveyed rightward on the guide member 259 and ejected onto the ejection section 254. A right end of the document sheet passes over the ejection section 254 and is placed on the canopies 257 or the tray 251. A left end of the document sheet is left on the ejection section 254 and placed on the ejection section 254 or the canopies 257. It is noted that, owing to the canopies 257 of the document width guides 255 above a document sheet set on the supply section 253, the document sheet to be fed, which is placed to straddle the supply section 253 and the tray 251, is separated in a favorable manner from an ejected document sheet placed to straddle the ejection section 254 and the tray 251.

<Image Reading>

The image reading unit 200 is configured to read an image of a document sheet in a flatbed method.

In image reading in the flatbed method, the ADF 202 is moved from the closed position where the ADF 202 is disposed (piled) on the image reading main body 201 to the open position where the ADF 202 is open with the front side thereof lifted relative to the image reading main body 201. Thereby, the document placement table 207 is exposed. On the exposed document placement table 207, a document sheet is placed with a side to be read facing the document placement table 207. Thereafter, the ADF 202 is returned to the closed position where the ADF 202 is disposed (piled) on the image reading main body 201. The document sheet is pressed against the contact glass 205 by the document pressing plate 213. Then, while the CIS unit 211, together with the carriage 210, is moved rightward from a standby position at a predetermined speed, the CIS unit 211 emits light onto the document sheet on the document placement table 207. When light reflected by the document sheet is received by the image sensor of the CIS unit 211, accomplished is reading an image formed on the document sheet.

Further, the image reading unit 200 is configured to read an image of a document sheet in an ADF method.

In image reading in the ADF method, the CIS unit 211 is moved from the standby position to a position facing the document contact portion 208 from beneath, and is statically placed in the position. In addition, the ADF 202 is used for image reading in the ADF method. By the ADF 202, a document sheet is fed in contact with the document contact portion 208. At that time, the CIS unit 211 emits light onto the document sheet in contact with the document contact portion 208. When light reflected by the document sheet is received by the image sensor of the CIS unit 211, accomplished is reading an image formed on the document sheet.

<Advantageous Effects>

As described above, the protruding portions 262 protruding toward the CIS unit 211 are provided on the upper surface 245 of the bottom plate 221 of the carriage 210.

Thereby, as shown in FIG. 4, outside light N incident onto the upper surface 245 of the bottom plate 221 of the carriage 210 is reflected by the protruding portions 262. Therefore, it is possible to reduce an amount of outside light N reflected by the upper surface 245 and directed toward the CIS unit 211. Consequently, it is possible to prevent an undesired situation where the outside light N incident to the CIS unit 211 causes a lowered accuracy for reading an image of a document sheet.

Further, since the amount of the outside light N incident to the CIS unit 211 is reduced, the CIS unit 211 is allowed to read the white reference plate 209 in a favorable manner. Hence, it is possible to achieve shading correction in a favorable manner.

The CIS unit 211 extends in the front-to-rear direction. The carriage 210 has the opening 234 that is open leftward and provided on a left side of the CIS unit 211. The protruding portions 262 are disposed in the same position as the opening 234 in the front-to-rear direction, on the upper surface 245 of the bottom plate 221 of the carriage 210.

Thereby, even when the outside light N is incident to the carriage 210 through the opening 234, the incident outside light N is reflected by the protruding portions 262. Accordingly, it is possible to prevent the outside light N incident through the opening 234 from being reflected toward the CIS unit 211 by the upper surface 245 of the bottom plate 221 of the carriage 210.

It is noted that the above description "the protruding portions 262 are disposed in the same position as the opening 234 in the front-to-rear direction, on the upper surface 245 of the bottom plate 221 of the carriage 210" may contain a meaning that the protruding portions 262 are disposed in the same position as at least a part of the opening 234 in the front-to-rear direction, on the upper surface 245 of the bottom plate 221 of the carriage 210. Further, the description "the protruding portions 262 are disposed in the same position as the opening 234 in the front-to-rear direction, on the upper surface 245 of the bottom plate 221 of the carriage 210" may contain a meaning that the protruding portions 262 are at least partially disposed in the same position as the opening 234 in the front-to-rear direction, on the upper surface 245 of the bottom plate 221 of the carriage 210.

Each protruding portion 262 is provided with the inclined surface 263 that is inclined to become lower leftward (such that a right end of the inclined surface 263 is higher than a left end thereof).

As the inclined surface 263 is inclined to become lower leftward, as shown in FIG. 9, the inclined surface 263 is allowed to reflect the outside light N incident through the opening 234 toward the opening 234, viz., in a direction indicated by an arrow R in FIG. 4. Thus, it is possible to reduce the amount of the outside light N incident to the CIS unit 211.

As shown in FIG. 9 (which is a cross-sectional view of the plurality of protruding portions 262), the plurality of protruding portions 262, each of which has the inclined surface 263, are arranged to form a saw-tooth shape. Namely, the plurality of inclined surfaces 263 exist on the upper surface 245 of the bottom plate 221 of the carriage 210.

The outside light N incident through the opening 234 is reflected by the plurality of inclined surfaces 263 toward the opening 234. Therefore, it is possible to further reduce the amount of the outside light N incident to the CIS unit 211.

The CIS unit 211 includes the connector 248 configured to connect with the one end of the FFC 249. Further, the opening 234 is disposed in the same position as the connector 248 in the front-to-rear direction.

The one end of the FFC 249 is allowed to be inserted into and pulled out from the connector 248 by use of the opening 234. Further, even though the outside light N is incident to the carriage 210 through the opening 234, the incident outside light N is reflected by the protruding portions 262. Accordingly, it is possible to prevent the outside light N incident through the opening 234 from being reflected toward the CIS unit 211 by the upper surface 245 of the bottom plate 221 of the carriage 210.

The CIS unit 211 is rotatable around the supporting shafts 243 and 244.

The opening 234 is provided in the same position as the connector 248 in the front-to-rear direction. Therefore, when the CIS unit 211 is rotated, the one end of the FFC 249 is allowed to move within the opening 234. Consequently, it is possible to smoothly rotate the CIS unit 211, and thus to cause the helical compression spring 247 to elastically urge the CIS unit 211 toward the contact glass 205 in a favorable manner.

The carriage 210 includes the second left portion 225 and the extension 226. The extension 226 is disposed on a left side of the CIS unit 211 and inclined in such a manner that a right end of the extension 226 is higher than a left end thereof. Namely, the extension 226 has the inclined surface 231 that is inclined to become lower leftward, as an upper surface facing the contact glass 205.

Thus, it is possible to reflect leftward the outside light N incident to the inclined surface 231 from a left side. Consequently, it is possible to reduce an amount of the outside light N incident to the CIS unit 211 in a favorable manner.

On a right side of the reference plate 206 including the white reference plate 209, disposed is the document placement table 207 configured to receive placement of a document sheet. Further, on a left side of the reference plate 206, disposed is the document contact portion 208 configured such that a document sheet being conveyed passes over the document contact portion 208.

Therefore, when shading correction is carried out before reading an image of a document sheet in the flatbed method, the outside light N is likely to be incident into the image reading main body 201 through the document contact portion 208. Further, the white reference plate 209 is disposed between the document placement table 207 and the document contact portion 208 in the left-to-right direction. Hence, in a known technique having no measure against the outside light N, the incident outside light N might have negative influences on the shading correction. However, since the image reading unit 200 is provided with the protruding portions 262, it is possible to prevent the outside light N transmitted through the document contact portion 208 from being incident to the CIS unit 211 when the CIS unit 211 reads the white reference plate 209. Thus, it is possible to achieve the shading correction in a favorable manner.

The document placement table 207 and the document contact portion 208 are formed from a single piece of the contact glass 205 disposed above the CIS unit 211.

Thereby, it is possible to reduce the number of components of the MFP 100.

The plurality of base projections 265 are formed on the bottom surface 204 of the housing 203. As shown in FIG. 10 (which is a cross-sectional view of the plurality of base projections 265), each base projection 265 is inclined such that a right end thereof is higher than a left end thereof. Namely, each base projection 265 has the inclined base surface 266 that is inclined to become lower leftward. Thus, the plurality of base projections 265 are arranged to form a saw-tooth shape.

Since each inclined base surface 266 is inclined to become lower leftward, as shown in FIG. 10, it is possible to cause the inclined base surfaces 266 to reflect the outside light N incident through the document contact portion 208 toward the document contact portion 208, that is, in the direction indicated by the arrow R. Consequently, it is possible to reduce the amount of the outside light N incident to the CIS unit 211 in a favorable manner.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations about the same configurations as exemplified in the aforementioned embodiment will be omitted.

[Modifications]

In the aforementioned embodiment, the carriage 210 is provided with the plurality of protruding portions 262. However, the carriage 210 may be provided with a single protruding portion 262. In this case, the single protruding portion 262 may be disposed in the same position as the opening 234 in the front-to-rear direction, below the CIS unit 211, with an upper end of the single protruding portion 262 facing the lower surface 246 of the CIS unit 211 across a small gap. Thereby, it is possible to reduce the amount of the outside light N incident to the CIS unit 211 in a favorable manner, by means of the single protruding portion 262.

Further, in the aforementioned embodiment, the MFP 100 includes a combination of the image reading unit 200 and the image forming unit 100. However, the image reading unit 200 may be configured to solely serve as an image scanner.

Further, the inclined surface 231 may include a plurality of projections arranged thereon in parallel on a side-by-side basis in the left-to-right direction. Each projection may have an inclined surface 263 that is inclined to become lower leftward, so as to have a substantially triangle cross-section along a plane perpendicular to the front-to-rear direction. Each projection may be a protrusion extending in the front-to-rear direction.

What is claimed is:

1. An image reader comprising:
a housing;
a document table;
a reading unit disposed between the housing and the document table and configured to read an image of a document sheet on the document table; and
a carriage configured to hold the reading unit thereon and to move along a moving direction, the carriage comprising a protruding portion formed to protrude toward the reading unit from an upward-facing surface of the carriage, the upward-facing surface facing upwardly toward a lower surface of the reading unit.

2. The image reader according to claim 1,
wherein the reading unit extends in an extending direction perpendicular to the moving direction,
wherein the carriage comprises an opening formed to be open toward a specific side in the moving direction, on the specific side of the reading unit in the moving direction, and
wherein the protruding portion is formed to protrude toward the reading unit, in a same position as the opening in the extending direction, on the upward-facing surface of the carriage.

3. The image reader according to claim 2,
wherein the reading unit comprises a connector configured to connect with an end of a cable,
wherein the opening is formed in a same position as the connector in the extending direction, and
wherein the protruding portion is formed to protrude toward the reading unit, in a same position as the opening and the connector in the extending direction, on the upward-facing surface of the carriage.

4. The image reader according to claim 2,
wherein the protruding portion comprises an inclined surface that is inclined such that an end of the inclined surface on an opposite side to the specific side in the moving direction is higher than another end thereof on the specific side in the moving direction.

5. The image reader according to claim 4,
wherein the protruding portion comprises two or more of the inclined surface.

6. The image reader according to claim 1,
wherein the reading unit extends in an extending direction perpendicular to the moving direction,
wherein the carriage comprises a rotation supporter configured to engage with an engagement portion provided at at least one end of the reading unit in the extending direction and to support the reading unit rotatably around the engagement portion, and
wherein the image reader further comprises an urging member configured to elastically urge the reading unit toward the document table.

7. The image reader according to claim 1,
wherein the carriage comprises:
a first extension formed to extend from the upward-facing surface of the carriage toward the document table, on a specific side of the reading unit in the moving direction; and
a second extension extending from the first extension toward the specific side in the moving direction, the second extension comprising a slanted surface that faces the document table and is inclined such that an end of the slanted surface on an opposite side to the specific side in the moving direction is higher than another end thereof on the specific side in the moving direction.

8. The image reader according to claim 1,
wherein the document table comprises:
- a boundary portion comprising a white reference member disposed on a side of the document table with respect to the reading unit and configured to be read as a white reference by the reading unit;
- a first transparent portion that is made of a transparent material, disposed on a first side of the boundary portion in the moving direction, and configured to receive placement of a document sheet; and
- a second transparent portion that is made of a transparent material, disposed on a second side of the boundary portion in the moving direction, and configured such that a document sheet being conveyed passes over the second transparent portion.

9. The image reader according to claim 8,
wherein the protruding portion comprises an inclined surface that is inclined such that an end of the inclined surface on the first side in the moving direction is higher than another end thereof on the second side in the moving direction.

10. The image reader according to claim 8,
wherein the first transparent portion and the second transparent portion are formed from a single piece of glass plate.

11. The image reader according to claim 8,
wherein the housing comprises:
- a base configured to face an opposite surface of the upward-facing surface of the carriage; and
- a base projection provided on the base and formed to protrude toward the document table, the base projection comprising an inclined base surface that is inclined such that an end of the inclined base surface on the first side in the moving direction is higher than another end thereof on the second side in the moving direction.

12. The image reader according to claim 1,
wherein the protruding portion is formed on the upward-facing surface of the carriage so as to prevent light incident to the upward-facing surface of the carriage from being reflected toward the reading unit.

13. An image reader comprising:
a housing;
a document table;
a reading unit disposed between the housing and the document table and configured to read an image of a document sheet on the document table; and
a carriage configured to hold the reading unit thereon and to move along a moving direction, the carriage comprising a reflection reduction portion formed on an upward-facing surface of the carriage, the upward-facing surface facing upwardly toward a lower surface of the reading unit, the reflecting reduction portion configured to reduce an amount of light incident to the upward-facing surface of the carriage and reflected toward the reading unit.

14. The image reader according to claim 13,
wherein the reading unit extends in an extending direction perpendicular to the moving direction,
wherein the carriage comprises an opening formed to be open toward a specific side in the moving direction, on the specific side of the reading unit in the moving direction, and
wherein the reflection reduction portion is configured to reduce an amount of light incident to the upward-facing surface of the carriage through the opening and reflected toward the reading unit.

15. The image reader according to claim 13,
wherein the document table comprises:
- a boundary portion comprising a white reference member disposed on a side of the document table with respect to the reading unit and configured to be read as a white reference by the reading unit;
- a first transparent portion that is made of a transparent material, disposed on a first side of the boundary portion in the moving direction, and configured to receive placement of a document sheet; and
- a second transparent portion that is made of a transparent material, disposed on a second side of the boundary portion in the moving direction, and configured such that a document sheet being conveyed passes over the second transparent portion, and wherein the reflection reduction portion is configured to reduce an amount of light incident to the upward-facing surface of the carriage through the second transparent portion and reflected toward the reading unit.

16. An image reader comprising:
a housing having an opening;
a document table configured to cover the opening of the housing;
an image reading unit disposed between the document table and the housing, the image reading unit comprising:
- an image sensor unit configured to read an image of a document sheet on the document table in a main-scanning direction; and
- a carriage configured to hold the image sensor thereon and to move along a sub-scanning direction perpendicular to the main-scanning direction, the carriage comprising a surface that faces toward the document table and is formed with protrusions in a saw-tooth shape to prevent light incident through the document table from being reflected toward the image sensor unit, the protrusion extending upwardly toward the document table.

* * * * *

UNITED STATES PATENT AND TRADEMARK OFFICE
CERTIFICATE OF CORRECTION

| | | |
|---|---|---|
| PATENT NO. | : 8,934,149 B2 | Page 1 of 1 |
| APPLICATION NO. | : 13/934454 | |
| DATED | : January 13, 2015 | |
| INVENTOR(S) | : Yoshinori Osakabe et al. | |

It is certified that error appears in the above-identified patent and that said Letters Patent is hereby corrected as shown below:

On Page 2, under References Cited, U.S. Patent Documents:
　　Please insert --2002/0054776 A1 5/2002 Iimuro--

On Page 2, under References Cited, Foreign Patent Documents:
　　Please delete "JP 11-074497 5/2003" and replace with --JP 11/074497 3/1999--

On Page 2, under References Cited, Foreign Patent Documents:
　　Please delete "TW 4199256 A" and replace with --TW 4199256 B--

Signed and Sealed this
First Day of March, 2016

Michelle K. Lee
*Director of the United States Patent and Trademark Office*